Patented Dec. 8, 1936

2,063,078

UNITED STATES PATENT OFFICE 2,063,078

FINISHING SYSTEM

Harold J. Barrett, Wilmington, Del., assignor to E. I. du Pont de Nemours & Company, Wilmington, Del., a corporation of Delaware No Drawing. Application April 26, 1933, Serial No. 668,037

7 Claims. (Cl. 91—68)

This invention relates to a new method for the finishing of articles and surfaces by the application of coating compositions thereto and particularly to a new method involving the provision of a durable transparent finish for an enameled or similar color-coated surface.

It is an object of the present invention to provide a finish comprising an enamel coating system and a finish coat of hard, durable, clear character.

It is a further object of the invention to provide a method of protecting enameled surfaces with a transparent substantially colorless film, capable of withstanding wear and weather and thereby affording protection for the color coat.

Other objects and advantages of the invention will be apparent from the following specification in which its preferred embodiments are described.

The nitrocellulose enamels almost universally used for the protective coatings on automobiles and widely used as durable protective and decorative coatings on other articles of manufacture subjected to outdoor exposure possess the outstanding defect of chalking or becoming dull. Intensive investigations have been conducted in an effort to determine the fundamental cause of this chalking and to prevent it. It has frequently been proposed to apply as the final coat an unpigmented finish on the theory that slow disintegration of this clear top coat will not leave a chalky pigment residue on the surface. Such "durable clears" have heretofore failed to solve the problem in a practical way. For one reason, the clear vehicles of even some of the most durable enamels require the protection of pigments against the action of light and have not alone sufficient outdoor life. Furthermore, it has been found that clear coatings which are quite durable on wood and other types of surfaces, for some unknown reason, fail prematurely when applied over nitrocellulose enamels as a result of the formation of blisters. Therefore, it cannot be assumed that a clear finish of proved resistance to weathering will be durable over nitrocellulose enamels. On the contrary, in normal coat thicknesses "durable clears" heretofore known fail within three to six months over nitrocellulose, apparently irrespective of their outdoor life over other surfaces.

I have now found that the polymers of the methyl ester of alpha methyl acrylic acid give remarkable protection to nitrocellulose enamels when applied as a clear top coating. The reason for this unexpected result is as yet not clear. It has been proposed that the unique and premature blistering which ordinarily occurs in clear coatings over nitrocellulose enamels has its basis in the phenomenon of osmosis, moisture permeating through the clear coating to accumulate in tiny water blisters which form between the clear and the nitrocellulose enamel. In any case, it has been found that clear films of the polymers of the methyl ester of alpha methyl acrylic acid are unusually impermeable to moisture in comparison with films of other coatings, such as varnishes and nitrocellulose enamels. Another factor which undoubtedly has a bearing on this unusually good durability of methyl methacrylate polymers over nitrocellulose is the manner in which the methyl methacrylate polymer appears to bond itself to the nitrocellulose enamel. Under proper conditions a co-mingling or welding of the two seems to take place, leaving no sharp point of contact at which this blistering can take place.

While the polymers of the methyl ester of alpha methyl acrylic acid are particularly adapted to use as clear finishes over nitrocellulose enamels, unusually good results are also obtained when these resins are used as clear finishes over other coating compositions as described in the examples below. Certain pigmented coatings have a tendency to fail by checking or cracking before chalking occurs, and although a clear top coating of the polymer of the methyl ester of methyl acrylic acid has a tendency to increase the life of such coatings, probably because of the high degree of impermeability to moisture vapor which this clear possesses, it is to be understood that the new clears are particularly adapted to the prevention of chalking which occurs on the most durable enamels, such as nitrocellulose enamels referred to above.

Methyl methacrylate may be made by chlorinating isobutyric acid, esterifying the resultant chlorisobutyric acid with methanol, and removing hydrogen chloride from the methyl chlorisobutyrate. This process is described in the copending application of D. J. Loder, Ser. No. 593,411, filed February 16, 1932. Methyl methacrylate may also be prepared by treating methyl alphahydroxyisobutyrate with a dehydrating agent, e. g. phosphorus pentoxide, as described in the copending application of Rowland Hill, Serial No. 641,113.

The liquid methyl methacrylate may be polymerized with the aid of radiant energy (light or heat) with or without a catalyst. For example, the polymerization may readily be effected by adding 0.5% by weight of benzoyl peroxide and heating the mixture at 100° C. for four hours. The white product having somewhat the appearance of pumice may be used in the manufacture of the compositions hereinbefore described. In the preparation of the compositions the polymer is preferably used in a subdivided condition to facilitate solution. Methods for the preparation of methyl methacrylate polymer are described in detail in the Hill application, above referred to, and in the copending application of D. E. Strain, Ser. No. 668,080, filed April 26, 1933.

The viscosity of the solutions of methyl methacrylate polymer may be widely varied to suit the needs of particular cases. Thus, polymerization of methyl methacrylate at 65° C. without a catalyst yields a high viscosity material suitable for the preparation of brushing lacquers. With a lower viscosity polymer higher concentrations thereof may be employed in the lacquers, which are thus adapted for application by spraying. Polymers of decreased viscosity may be obtained by accelerating the polymerization, e. g. by employment of a catalyst and/or a higher polymerizing temperature.

To fresh pyroxylin or other enameled surfaces a coating of methyl methacrylate polymer may be applied as soon as the enamel has dried, one or more coats of the clear lacquer being put on directly either by spraying or brushing.

The general method of practicing the invention is illustrated by the following examples, although it is to be understood that the invention is not limited to the examples:

*Example 1.*—In applying the invention to a metal finishing system involving a built-up pyroxylin finish as an undercoat and a final coat of methyl methacrylate polymer, the primer and surfacer may be of any well known composition which will provide good adhesion and produce a smooth surface, for instance those of the oleoresinous type containing oils, driers, pigments, fillers, diluents, etc. After baking and sanding the primer and surfacer, a pyroxylin enamel of the following composition is applied. The parts are by weight:

|  | Parts |
|---|---|
| ZnO | 15 |
| Damar | 6 |
| Pyroxylin | 12 |
| Castor oil | 4 |
| Dibutyl phthalate | 1 |
| Solvents | 62 |

A clear polymerized methyl methacrylate lacquer of the following composition is applied directly, by spraying, to the above built-up system:

|  | Parts |
|---|---|
| MMA polymer | 10.0 |
| Toluene | 40.5 |
| Xylene | 29.5 |
| Ethoxyethanol | 20.0 |

Methyl methacrylate of low viscosity, suitable for preparation of a spraying lacquer according to the foregoing formula, is obtained by polymerizing methyl methacrylate with 1% benzoyl peroxide at 100° C.

*Example 2.*—In the preceding example the pyroxylin enamel may be replaced by a polybasic acid-polyhydric alcohol type enamel containing the following ingredients:

|  | Parts |
|---|---|
| Carbon black | 7.2 |
| Toluene | 32.1 |
| High flash naphtha | 15.6 |
| Resin | 45.1 |

The resin is made by heating 5.93 parts glycerol, 21.26 parts diethylene glycol, and 33.54 parts cocoanut oil in a closed kettle provided with a reflux condenser and stirring device. The temperature is brought to 250° C. in one hour and held there for two hours. 39.27 parts phthalic anhydride is then added and the temperature brought back to 250° C. as rapidly as possible and maintained there for one hour. The condenser is then removed and heating continued at the same temperature until the resin product shows an acid number of 20.

*Example 3.*—A wood surface is provided with an undercoat of blue pyroxylin enamel prepared according to the following formula:

|  | Parts |
|---|---|
| Imperial Chinese blue | 6.0 |
| ZnO | 3.0 |
| Pyroxylin | 10.0 |
| Damar | 2.88 |
| Butyl phthalate | 2.02 |
| Castor oil | 1.35 |
| Solvents | 74.75 |

A clear lacquer is applied to this surface by brushing or dipping, the lacquer being prepared by dissolving 20 parts by weight of methyl methacrylate polymer (such as used in Example 1) in 80 parts of toluene. The hard, smooth, lustrous finish obtained in this manner was substantially undeteriorated after many months' exposure to weather.

*Example 4.*—The following system is useful in the refinishing of weathered enameled surfaces. To a weathered pyroxylin or polybasic acid-polyhydric alcohol enamel (comprising a built-up system, such as in Example 1 or 2) the following methyl methacrylate polymer top-coat is applied:

|  | Parts |
|---|---|
| Damar | 9 |
| Methyl methacrylate | 9 |
| Toluene | 51 |
| Xylene | 22 |

If the low viscosity methyl methacrylate polymer of Example 1 is used, this lacquer may be sprayed. However, it should be brushed if high viscosity polymer is used, e. g. such as is made by polymerizing methyl methacrylate at 65° C. without a catalyst.

In the preceding examples methyl methacrylate clear finishes of the compositions given in the following examples may also be used:

*Example 5.*—A brushing lacquer is prepared from the following ingredients:

|  | Parts |
|---|---|
| Methyl methacrylate polymer (as in Example 1) | 24 |
| Cocoanut oil modified glyptal resin (as in Example 2) | 12 |
| Toluene | 28 |
| Butyl acetate | 21 |
| Xylene | 15 |

*Example 6.*—Methyl methacrylate polymer clear lacquers including a softener or plasticizer may also be used:

|  | Parts |
|---|---|
| Methyl methacrylate polymer (as in Example 1) | 14.2 |
| Coumarone resin | 14.2 |
| Butyl phthalate | 7.1 |
| Toluene | 50.2 |
| Xylene | 14.3 |

This lacquer may be applied by spraying and is especially adapted for use on wood and other surfaces requiring a coating of pliable character.

Finishes prepared in accordance with the invention are characterized by particularly attractive and durable luster and hardness. They are especially resistant to weather and to the action of water and alkali.

The invention may be applied to the finishing of uncoated surfaces as previously indicated, or it may be employed in the refinishing of worn and/or weathered pyroxylin or other enameled surfaces, particularly automobiles, by the application of a polymerized methyl methacrylate lacquer thereto.

If an old pyroxylin or glyptal surface is to be refinished, it is first cleaned. Thus, in the refinishing of automobiles and other metal surfaces, the old pyroxylin finish is thoroughly cleaned of foreign materials by the use of ordinary detergents, such as neutral soap. The cleaned finish may be sanded, wet or dry, to afford a smooth surface. A clear polymerized methyl methacrylate lacquer is then applied, either by spraying or brushing. Two or more coats are frequently advisable.

Various changes may be made in the specific ingredients and methods above recited without departing from the invention. Thus, solvents other than those named may be employed and other plasticizers, driers, resins, etc. may be included. The application of both the pyroxylin or other enamel and the methyl methacrylate polymer clear finish may involve any of the usual methods of application such as spraying, brushing, air-drying, baking, etc.

I claim:

1. An article of manufacture having an enameled surface with a clear finish coat of polymerized methyl methacrylate.

2. An article of manufacture having a pyroxylin-enameled metal surface with a clear finish coat of polymerized methyl methacrylate.

3. Process of finishing wood and metal surfaces which comprises applying an enamel to the suitably prepared surface, allowing the enamel to dry, and applying thereover a clear polymerized methyl methacrylate lacquer.

4. Process of finishing wood and metal surfaces which comprises applying a pyroxylin enamel to the suitably prepared surface, allowing the enamel to dry, and applying thereover a clear polymerized methyl methacrylate lacquer.

5. An article of manufacture having a metal base said base bearing a priming coat; an enamel coat comprising pigment, resin, cellulose ester, a solvent plasticizer for the ester, and a semi-drying oil; and a final clear coat comprising polymerized methylmethacrylate and ethoxyethanol.

6. Process of finishing metal surfaces which comprises applying thereto a priming coat, a pyroxylin enamel coat, allowing the same to dry, and applying thereover a clear coat comprising polymerized methylmethacrylate, a natural resin, a solvent plasticizer, and solvent.

7. In the process of coating surfaces wherein at least one cellulose derivative enamel base coat is applied, the step of applying thereover a clear coat containing polymerized methyl methacrylate.

HAROLD J. BARRETT.